(12) United States Patent
Sato (10) Patent No.: US 11,377,158 B2
(45) Date of Patent: Jul. 5, 2022

(54) HOLE PLUG

(71) Applicant: NIFCO INC., Kanagawa (JP)

(72) Inventor: Takehiro Sato, Kanagawa (JP)

(73) Assignee: NIFCO INC., Kanagawa (JP)

( * ) Notice: Subject to any disclaimer, the term of this patent is extended or adjusted under 35 U.S.C. 154(b) by 0 days.

(21) Appl. No.: 16/482,032

(22) PCT Filed: Jan. 31, 2018

(86) PCT No.: PCT/JP2018/003170
§ 371 (c)(1),
(2) Date: Jul. 30, 2019

(87) PCT Pub. No.: WO2018/143257
PCT Pub. Date: Aug. 9, 2018

(65) Prior Publication Data
US 2019/0382055 A1 Dec. 19, 2019

(30) Foreign Application Priority Data
Feb. 1, 2017 (JP) .............................. JP2017-016831

(51) Int. Cl.
*B62D 25/24* (2006.01)
*F16J 13/14* (2006.01)

(52) U.S. Cl.
CPC .............. *B62D 25/24* (2013.01); *F16J 13/14* (2013.01)

(58) Field of Classification Search
CPC ........... F16J 13/14; F16J 15/025; B62J 25/24; B62D 25/24

(Continued)

(56) References Cited

U.S. PATENT DOCUMENTS 7,114,632 B2 * 10/2006 Kraus .................... B62D 25/24
220/802
8,210,384 B2 * 7/2012 Kurth .................. B60R 13/0206
220/359.4
(Continued)

FOREIGN PATENT DOCUMENTS

CN 105659009 A 6/2016
DE 102009018395 * 11/2010 ............. B62D 25/24
(Continued)

OTHER PUBLICATIONS

Japanese Office Action dated Apr. 7, 2020 for Japanese Patent Application No. 2017-016831, pp. 1-8 (Machine Translation included).
(Continued)

*Primary Examiner* — D Glenn Dayoan
*Assistant Examiner* — Kevin P Weldon
(74) *Attorney, Agent, or Firm* — Thomas| Horsetemeyer, LLP (57) ABSTRACT

A hole plug includes: a tubular outer periphery wall portion for insertion into a burring hole formed in an attachment member; an annular flange portion that protrudes toward a radial direction outer side of the outer periphery wall portion, from an end portion side of the outer periphery wall portion at an opposite side from an insertion direction side of the outer periphery wall portion; a pawl portion that projects toward the radial direction outer side from the outer periphery wall portion; a closure portion that extends between inner sides of the outer periphery wall portion; and an abutting portion provided at at least one of the flange portion or the outer periphery wall portion, the abutting portion overlapping with a periphery edge portion of the burring hole as seen in the insertion direction, and the abutting portion configured to abut the periphery edge portion.

2 Claims, 7 Drawing Sheets

(58) Field of Classification Search
USPC ...................................................... 296/1.06
See application file for complete search history.

(56) References Cited

U.S. PATENT DOCUMENTS

| | | | |
|---|---|---|---|
| 8,814,993 B2 * | 8/2014 | Yano .................. | H05K 5/0213 96/4 |
| 2011/0233950 A1 | 9/2011 | Takita | |
| 2014/0125081 A1 * | 5/2014 | Pares Isanta .......... | B62D 25/24 296/1.06 |
| 2016/0264186 A1 | 9/2016 | Sato | |

FOREIGN PATENT DOCUMENTS

| | | | | |
|---|---|---|---|---|
| DE | 102009018395 A1 | | 11/2010 | |
| EP | 465860 | * | 6/1991 | ............. B62D 25/00 |
| EP | 3816022 A1 | * | 5/2021 | ............. B62D 25/24 |
| JP | S61-059067 A | | 3/1986 | |
| JP | H03-012029 U | | 2/1991 | |
| JP | H3-33265 U | | 4/1991 | |
| JP | 2001-080657 A | | 3/2001 | |
| JP | 2005-207513 A | | 8/2005 | |
| JP | 2015-81659 A | | 4/2015 | |
| JP | 5844207 B2 | | 1/2016 | |
| JP | 2016-191462 A | | 11/2016 | |
| WO | WO2005/114011 | * | 12/2005 | |
| WO | WO-2010041435 A1 | * | 4/2010 | ......... B60R 16/0222 |
| WO | WO-2018111505 A1 | * | 6/2018 | ............. B62D 25/24 |

OTHER PUBLICATIONS

Office Action for Chinese Patent Application No. 201880008619.3, dated Jan. 2, 2020, pp. 1-5 (translation not included).
Extended European Search Report dated Oct. 13, 2020 for European Patent Application No. 18748633.7, pp. 1-7.

* cited by examiner

HOLE PLUG

CROSS-REFERENCE TO RELATED APPLICATIONS

This application is the National Stage of International Application No. PCT/JP2018/003170, filed Jan. 31, 2018, which claims priority to Japanese Application No. 2017-016831, filed Feb. 1, 2017, which are entirely incorporated herein by reference.

TECHNICAL FIELD

The present disclosure relates to a hole plug.

BACKGROUND ART

Japanese Patent No. 5844207 discloses a hole plug to be attached at a penetrating hole formed in an attachment member. This hole plug is provided with: a tubular outer periphery wall portion that is inserted into the penetrating hole; and an annular flange portion that protrudes toward a radial direction outer side of the outer periphery wall portion from an end portion of the outer periphery wall portion at an opposite side from an insertion direction side of the outer periphery wall portion, the flange portion covering surrounding portions of a burring hole.

SUMMARY OF INVENTION

Technical Problem

However, when the hole plug disclosed in Japanese Patent No. 5,844,207 is attached to a burring hole formed in an attachment member, if the hole plug is pushed more strongly than necessary into the burring hole, the flange portion may deform and be dragged into the interior of the burring hole, and the hole plug may pass through the burring hole.

In consideration of the circumstances described above, an object of the present disclosure is to provide a hole plug that, during attaching to a burring hole formed in an attachment member, is inhibited from passing through the burring hole.

Solution to Problem

A hole plug according to an aspect of the present disclosure includes: a tubular outer periphery wall portion for insertion into a round tube portion of a burring hole formed in an attachment member; an annular flange portion that protrudes toward a radial direction outer side of the outer periphery wall portion from an end portion side of the outer periphery wall portion that is at the opposite side from an insertion direction side of the outer periphery wall portion, the flange portion covering a surrounding portion of the burring hole; a pawl portion that projects toward the radial direction outer side from the outer periphery wall portion, the pawl portion engaging with a distal end portion of the round tube portion; a closure portion that extends between inner sides of the outer periphery wall portion, the closure portion closing off the burring hole; and an abutting portion provided at at least one of the flange portion or the outer periphery wall portion, the abutting portion overlapping with a periphery edge portion of the burring hole as seen in the insertion direction, and the abutting portion configured to abut the periphery edge portion.

Advantageous Effects of Invention

The present disclosure may provide a hole plug that, during attaching to a burring hole formed in an attachment member, is inhibited from passing through the burring hole.

DETAILED DESCRIPTION

A hole plug 20 according to an exemplary embodiment of the present disclosure is described using FIG. 1 to FIG. 5.

The hole plug 20 according to the present exemplary embodiment is a member that closes off a burring hole 12 formed in a bracket 10. The arrow X that is shown in some of the drawings of FIG. 1 to FIG. 5 indicates an insertion direction (below referred to where appropriate as "the plug insertion direction") of the hole plug 20 (and of an outer periphery wall portion 22, which is described below), and the arrow Y indicates a diametric direction (below referred to where appropriate as "the plug radial direction") of the hole plug 20 (and of the outer periphery wall portion 22 that is described below). The reference symbol CL indicates a center line of the hole plug 20 (and of the outer periphery wall portion 22). The term "plug radial direction inner side" indicates a side that is closer to the center line CL along the plug radial direction, and the term "plug radial direction outer side" indicates a side that is further from the center line CL along the plug radial direction.

Figure 4:
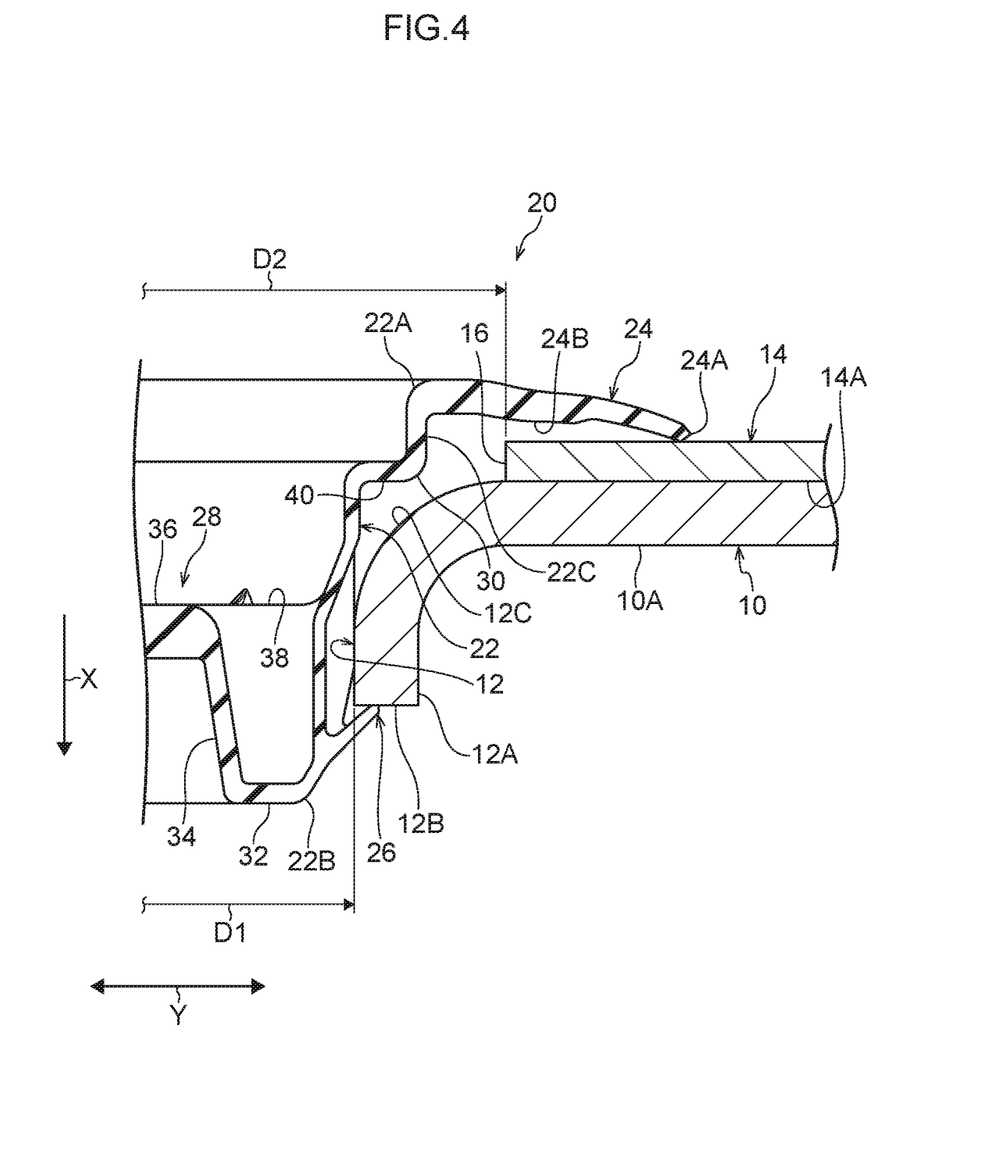
FIG. 4 is a sectional diagram (a partial magnified diagram of the section corresponding to FIG. 2) cut along an insertion direction of the hole plug, showing a state in which the hole plug shown in FIG. 1 is attached at a burring hole of an attachment member.
Figure 5:
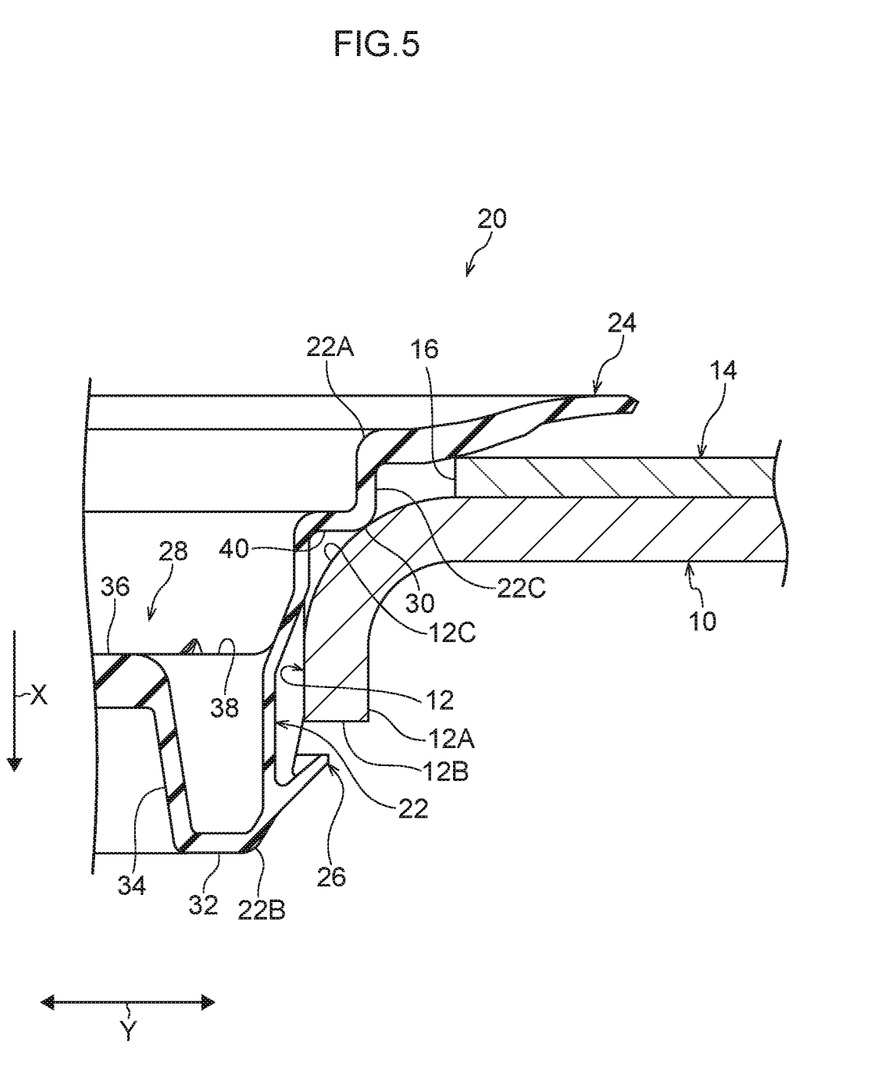
FIG. 5 is a sectional diagram (a partial magnified diagram of the section corresponding to FIG. 2) cut along the insertion direction of the hole plug, showing a state in which the hole plug shown in FIG. 1 is excessively inserted into the burring hole of the attachment member.

As shown in FIG. 4, the bracket 10 is, for example, a member that is attached to a panel member 14 (a body panel or the like) of a vehicle. The bracket 10 includes a plate-shaped portion 10A. The burring hole 12 is formed in the plate-shaped portion 10A. In a state in which the burring hole 12 of the bracket 10 is aligned with a penetrating hole 16 formed in the panel member 14, the bracket 10 is attached to an inner face 14A of the panel member 14. As shown in FIG. 4, a diameter D1 of the burring hole 12 is smaller than a diameter D2 of the penetrating hole 16. The bracket 10 according to the present exemplary embodiment is an example of an attachment member of the present disclosure.

In the present exemplary embodiment, in the state in which the hole plug 20 is attached to the burring hole 12 of the bracket 10 (the state shown in FIG. 4), a flange portion 24, which is described below, covers as far as surrounding portions of the penetrating hole 16 of the panel member 14.

Figure 1:
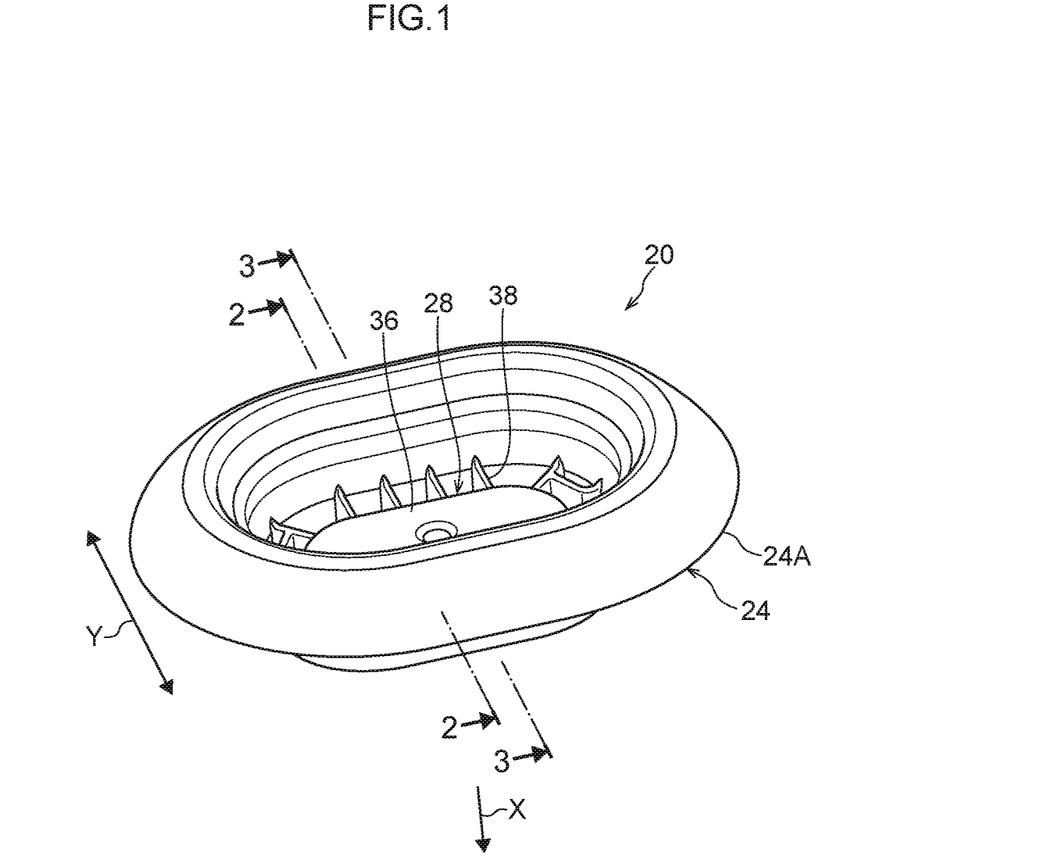
FIG. 1 is a perspective view of a hole plug according to an exemplary embodiment of the present disclosure, seen from diagonally upward.
Figure 2:
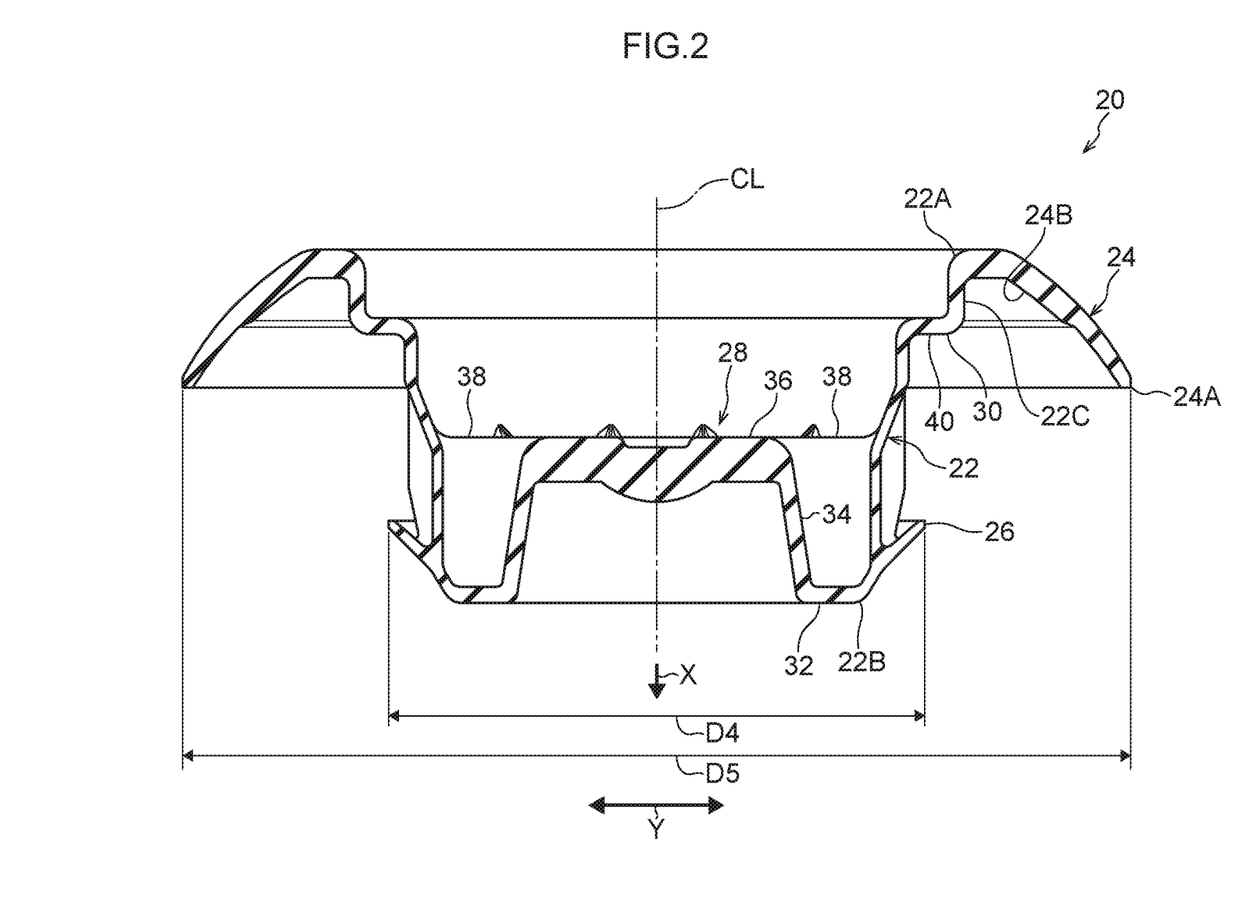
FIG. 2 is a sectional diagram of the hole plug shown in FIG. 1, cut along line 2-2.
Figure 3:
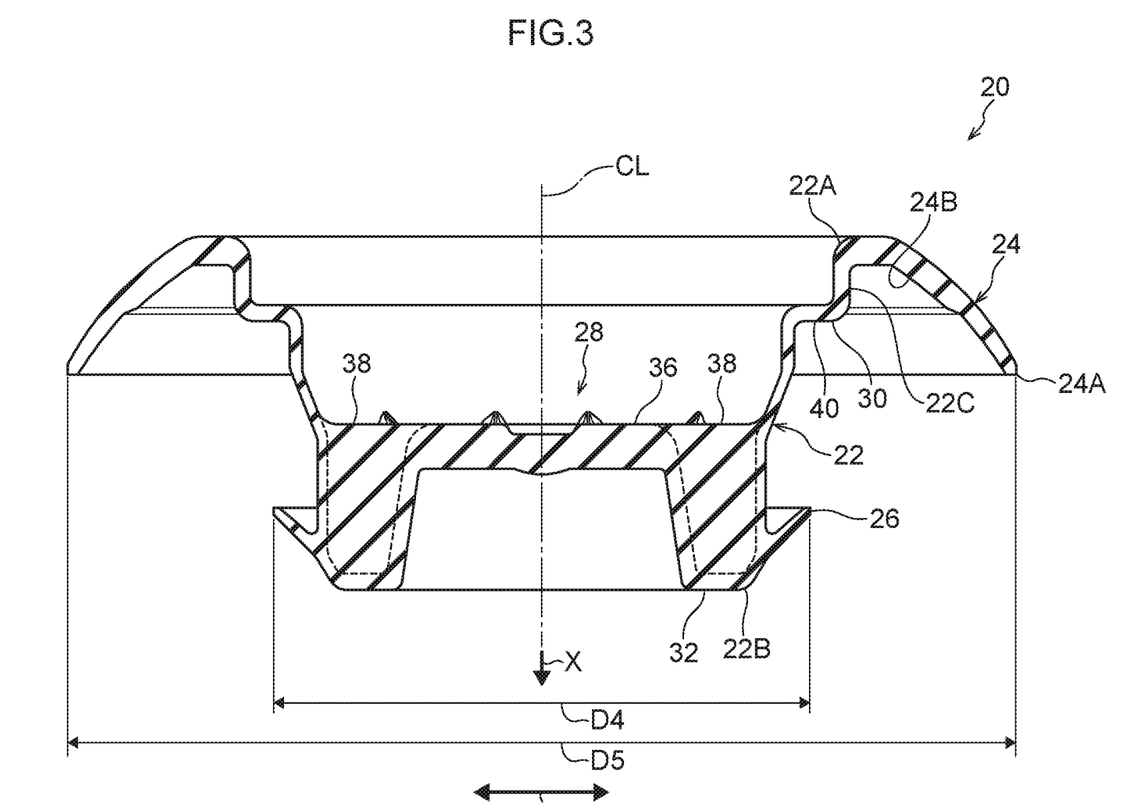
FIG. 3 is a sectional diagram of the hole plug shown in FIG. 1, cut along line 3-3.

As shown in FIG. 1 to FIG. 3, the hole plug 20 is provided with the outer periphery wall portion 22, the flange portion 24, a pawl portion 26, a closure portion 28 and an abutting portion 30. The hole plug 20 according to the present exemplary embodiment is an integrally molded component formed of a resiliently deformable resin.

The outer periphery wall portion 22 is formed in a tubular shape (in the present exemplary embodiment, a round tube shape). The outer periphery wall portion 22 is formed for insertion into the penetrating hole 16 of the panel member 14 and the burring hole 12 of the bracket 10. The term "round tube shape" as used in the present exemplary embodiment is intended to encompass shapes whose cross sections are circular or oval. The term "annular" as used in the present exemplary embodiment is also intended to encompass circular and oval shapes.

The flange portion 24 protrudes toward the plug radial direction outer side from an end portion 22A that is at the opposite side of the outer periphery wall portion 22 from the plug insertion direction side thereof. The flange portion 24 is formed in an annular shape. A diameter D3 of a distal end portion 24A of the flange portion 24 according to the present exemplary embodiment is greater than the diameter D2 of the penetrating hole 16 of the panel member 14. Therefore, in the state in which the hole plug 20 is attached at the burring hole 12 of the bracket 10, surrounding portions of the penetrating hole 16 of the panel member 14 are covered by the flange portion 24.

The pawl portion 26 projects from the side of an end portion 22B that is at the plug insertion direction side of the outer periphery wall portion 22. The pawl portion 26 projects toward the plug radial direction outer side and to the opposite side from the plug insertion direction. The pawl portion 26 is formed continuously along an outer periphery of the outer periphery wall portion 22 and is formed in an annular shape. A diameter D4 of a distal end of the pawl portion 26 is greater than the diameter D1 of the burring hole 12. That is, the distal end of the pawl portion 26 overlaps as seen in the plug insertion direction with the distal end portion 12B of a round tube portion 12A of the burring hole 12. When the hole plug 20 (the outer periphery wall portion 22) is being inserted into the burring hole 12, an outer periphery face of the pawl portion 26 abuts against an inner periphery face of the round tube portion 12A of the burring hole 12, and the pawl portion 26 deforms in a direction of reducing diameter. When the pawl portion 26 in this reduced-diameter state passes beyond a distal end portion 12B of the round tube portion 12A, the pawl portion 26 restores to the original state thereof. Hence, because the diameter D4 of the distal end of the pawl portion 26 is greater than the diameter D1 of the burring hole 12, if a force acts in a direction to remove the hole plug 20 from the burring hole 12 (the opposite direction from the plug insertion direction), the pawl portion 26 engages with (abuts against) the distal end portion 12B, limiting movement of the hole plug 20 in the removal direction.

The closure portion 28 extends between inner sides of the outer periphery wall portion 22 and closes off the inside of the outer periphery wall portion 22. Therefore, in the state in which the hole plug 20 is attached at the burring hole 12 of the bracket 10, the burring hole 12 is closed off by the closure portion 28. The closure portion 28 is provided with an annular inner side protruding portion 32, an annular inner periphery wall portion 34, and a face plate portion 36. The inner side protruding portion 32 protrudes toward the plug radial direction inner side from the end portion 22B at the plug insertion direction side of the outer periphery wall portion 22. The inner periphery wall portion 34 extends from an inner periphery end portion of the inner side protruding portion 32 to the opposite side from the plug insertion direction. The face plate portion 36 extends between end portions of the inner periphery wall portion 34 that are at the opposite side of the inner periphery wall portion 34 from the plug insertion direction.

Reinforcing ribs 38 that connect the inner periphery wall portion 34 with the outer periphery wall portion 22 are formed between the inner periphery wall portion 34 and the outer periphery wall portion 22. The reinforcing ribs 38 are formed at intervals in the circumferential direction of the outer periphery wall portion 22. When the hole plug 20 is being inserted into the burring hole 12, the hole plug 20 can be easily inserted into the burring hole 12 by the face plate portion 36 being pushed in. Because the inner periphery wall portion 34 and outer periphery wall portion 22 are connected by the reinforcing ribs 38, a pushing force pushing against the face plate portion 36 may be efficiently transmitted to the outer periphery wall portion 22. Further, because the outer periphery wall portion 22 is supported by the reinforcing ribs 38, tilting of the outer periphery wall portion 22 toward the plug radial direction inner side is suppressed.

An annular outer side protruding portion 40 is formed at an intermediate portion in the plug insertion direction of the outer periphery wall portion 22 (a portion between the end portion 22A and the end portion 22B in the plug insertion direction). The outer side protruding portion 40 is inflected partway along the intermediate portion and protrudes toward the plug radial direction outer side. A distal end portion side (outer periphery end portion side) of the outer side protruding portion 40 configures the abutting portion 30. The distal end portion side of the outer side protruding portion 40 overlaps with a periphery edge portion 12C of the burring hole 12 as seen in the plug insertion direction.

Now, operational effects of the hole plug 20 according to the present exemplary embodiment are described.

In the hole plug 20, when the face plate portion 36 of the closure portion 28 is pushed and the outer periphery wall portion 22 enters into the round tube portion 12A of the burring hole 12, the pawl portion 26 engages with the distal end portion 12B of the round tube portion 12A. Hence, disengagement of the hole plug 20 from the burring hole 12 is prevented. In the engaged state of the pawl portion 26, the closure portion 28 closes off the burring hole 12 and the flange portion 24 covers surrounding portions of the burring hole 12 and surrounding portions of the penetrating hole 16. Therefore, the burring hole 12 and the penetrating hole 16 are hidden by the hole plug 20.

When the hole plug 20 is being inserted into the burring hole 12, if the closure portion 28 is pushed more strongly than necessary, the rear face 24B of the flange portion 24 abuts against the periphery edge portion 12C, which is inflected in a circular arc shape, of the burring hole 12 and the flange portion 24 deforms in a direction of reducing diameter. The flange portion 24 starts to be dragged inside the burring hole 12 by this diameter-reducing deformation. However, in the hole plug 20, the abutting portion 30 (the distal end portion side of the outer side protruding portion 40) that overlaps with the periphery edge portion 12C of the burring hole 12 as seen in the plug insertion direction abuts against the periphery edge portion 12C of the burring hole 12. Therefore, when the hole plug 20 is being attached to the burring hole 12 formed in the bracket 10, the burring hole 12 is more inhibited from passing through the burring hole 12 compared to, for example, a structure in which the outer side protruding portion 40 is not provided at the outer periphery wall portion 22.

In the hole plug 20, the distal end portion side of the outer side protruding portion 40 formed at the intermediate portion of the outer periphery wall portion 22 is formed to serve as the abutting portion 30. Therefore, in contrast to, for example, a structure in which an abutting portion for abutting against the periphery edge portion 12C of the burring hole 12 is formed at the hole plug 20 as a dedicated portion, there is no need to greatly alter the shape of the hole plug 20, and design costs may be restrained.

In the hole plug 20, a wall portion 22C of the outer periphery wall portion 22 from the outer side protruding portion 40 to the end portion 22A extends in the plug insertion direction.
Therefore, when the abutting portion 30 abuts against the periphery edge portion 12C of the burring hole 12, the abutting portion 30 is braced in the opposite direction to an insertion force. Thus, the flange portion 24 may be further inhibited from being dragged into the burring hole 12.

Alternative Embodiments

Figure 6:
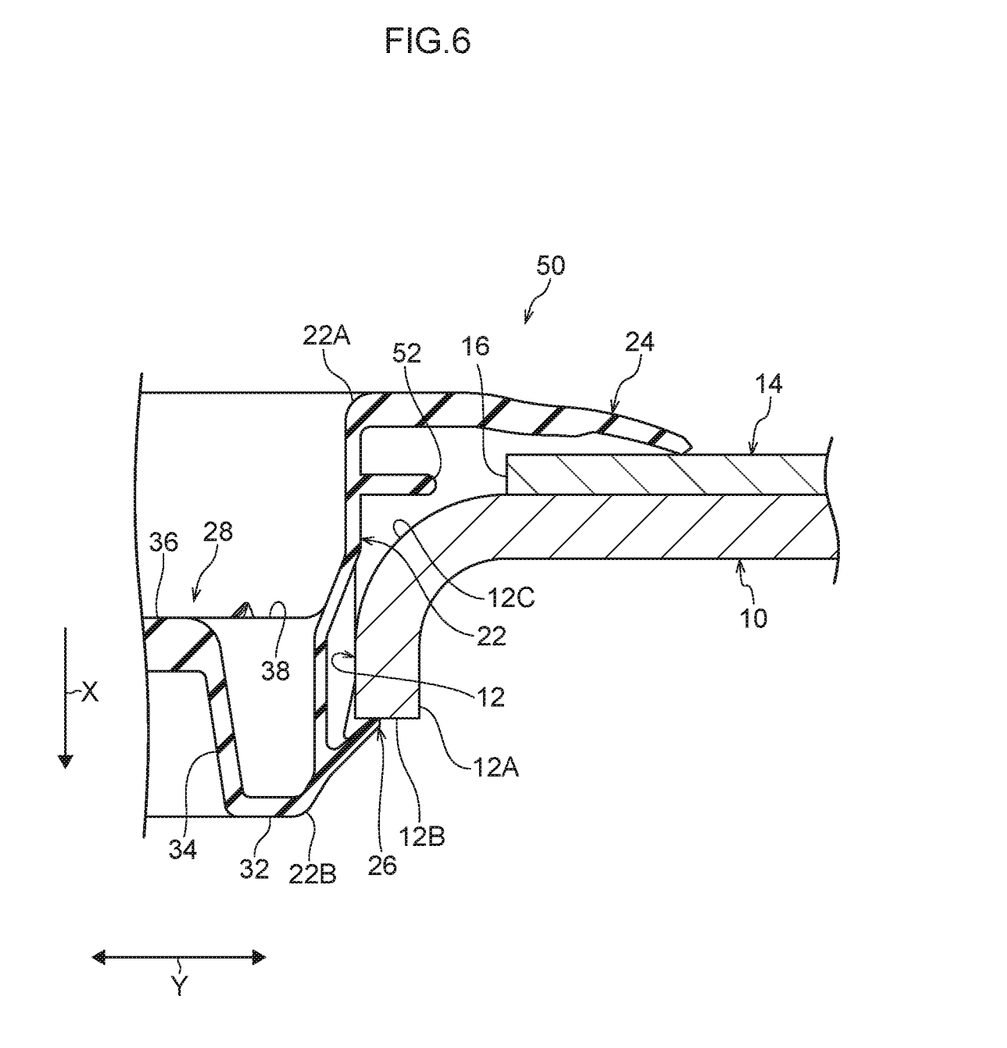
FIG. 6 is a sectional diagram (a section corresponding to FIG. 4) of a hole plug according to an alternative embodiment of the present disclosure.
Figure 7:
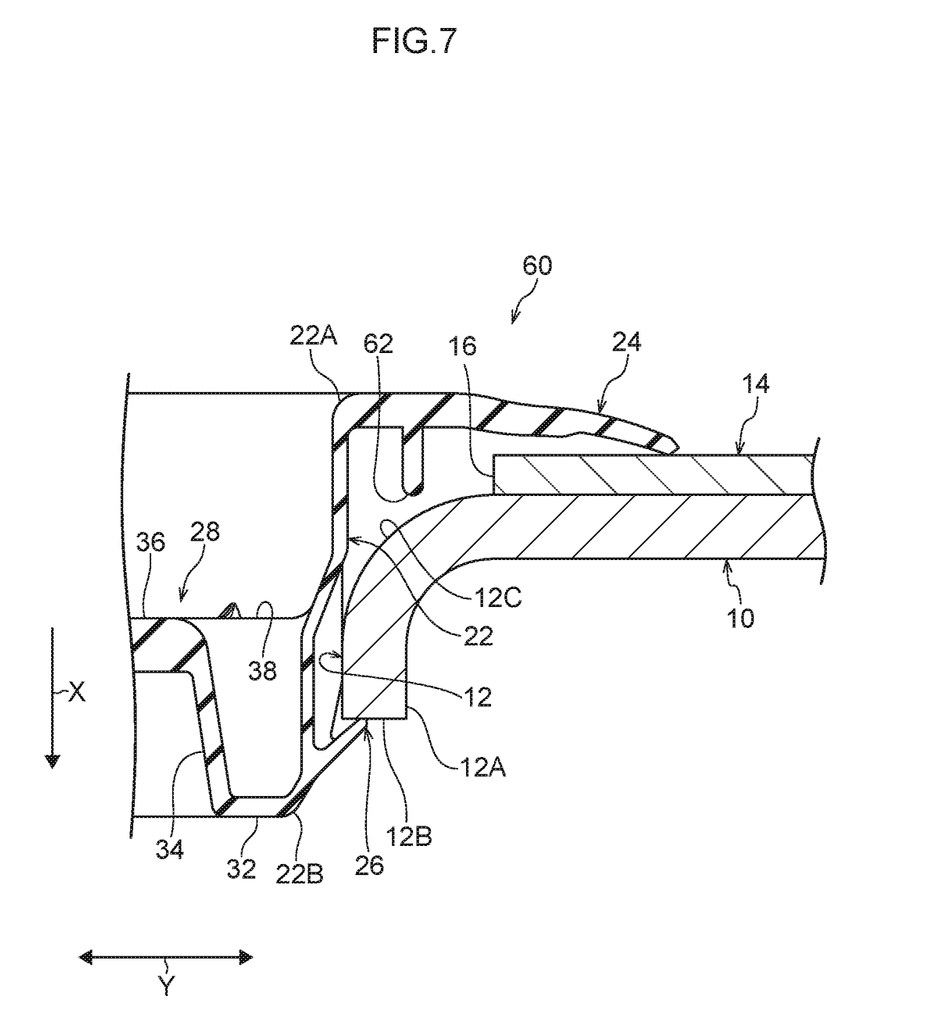
FIG. 7 is a sectional diagram (a section corresponding to FIG. 4) of a hole plug according to another alternative embodiment of the present disclosure.

In the exemplary embodiment described above, the distal end portion side of the outer side protruding portion 40 configures the abutting portion 30, but the present disclosure is not limited by this structure. For example, as in a hole plug 50 illustrated in FIG. 6, a structure may be provided with an annular protruding portion 52 that protrudes toward the plug radial direction outer side from an outer periphery face of the outer periphery wall portion 22 instead of the outer side protruding portion 40 being formed at the outer periphery wall portion 22. Similarly to the outer side protruding portion 40 according to the exemplary embodiment described above, the protruding portion 52 overlaps with the periphery edge portion 12C of the burring hole 12 as seen in the plug insertion direction. As a further example, as in a hole plug 60 illustrated in FIG. 7, a structure may be provided with a protruding portion 62 in a round tube shape that protrudes in the plug insertion direction from a rear face 24B of the flange portion 24. Similarly to the outer side protruding portion 40 according to the exemplary embodiment described above, the protruding portion 62 overlaps with the periphery edge portion 12C of the burring hole 12 as seen in the plug insertion direction. As still another example, a structure may be both provided with the protruding portion 52 at the outer periphery wall portion 22 and provided with the protruding portion 62 at the flange portion 24.

In the exemplary embodiment described above, the flange portion 24 protrudes from the end portion 22A of the outer periphery wall portion 22, but the present disclosure is not limited by this structure. For example, the flange portion 24 may protrude from the end portion 22A side of the outer periphery wall portion 22 (i.e., further to the end portion 22A side than the middle in the plug insertion direction of the outer periphery wall portion 22).

In the exemplary embodiment described above, the pawl portion 26 projects from the end portion 22B side of the outer periphery wall portion 22 (i.e., further to the end portion 22B side than the middle in the plug insertion direction of the outer periphery wall portion 22), but the present disclosure is not limited by this structure. For example, the pawl portion 26 may project from the end portion 22B of the outer periphery wall portion 22.

In the exemplary embodiment described above, the pawl portion 26 is formed in an annular shape, but the present disclosure is not limited by this structure. Structures are possible in which a plural number of the pawl portion 26 are formed at the outer periphery face of the outer periphery wall portion 22, spaced apart in the circumferential direction.

An exemplary embodiment of the present disclosure is described hereabove. However, the present disclosure is not limited by these descriptions and it will be clear that numerous modifications beyond these descriptions may be embodied within a technical scope not departing from the gist of the disclosure.

The following notes are disclosed in relation to the exemplary embodiment described above.
—Note 1—
The hole plug includes: a tubular outer periphery wall portion for insertion into a round tube portion of a burring hole formed in an attachment member; an annular flange portion that protrudes toward a radial direction outer side of the outer periphery wall portion, from an end portion side of the outer periphery wall portion at an opposite side from an insertion direction side of the outer periphery wall portion, the flange portion covering a surrounding portion of the burring hole; a pawl portion that projects toward the radial direction outer side from the outer periphery wall portion, the pawl portion engaging with a distal end portion of the round tube portion; a closure portion that extends between inner sides of the outer periphery wall portion, the closure portion closing off the burring hole; and an abutting portion provided at at least one of the flange portion or the outer periphery wall portion, the abutting portion overlapping with a periphery edge portion of the burring hole as seen in the insertion direction, and the abutting portion configured to abut the periphery edge portion.

In the hole plug according to Note 1, when the closure portion is pushed and the outer periphery wall portion is inserted into the round tube portion of the burring hole, the pawl portion engages with the distal end portion of the round tube portion. As a result, disengagement of the hole plug from the burring hole is prevented. In the engaged state of the pawl portion, the closure portion closes off the blurring hole and the flange portion covers surrounding portions of the burring hole. Thus, the burring hole is hidden by the hole plug.

When the hole plug is being inserted into the burring hole, if the closure portion is pushed more strongly than necessary, the flange portion deforms and starts to be dragged into the burring hole. However, in the hole plug described above, the abutting portion of the outer periphery wall portion that overlaps with the periphery edge portion of the burring hole as seen in the insertion direction abuts against the periphery edge portion of the burring hole. Therefore, during attaching to the burring hole formed in the attachment member, the hole plug is inhibited from passing through the burring hole.
—Note 2—
In the hole plug recited in Note 1, a protruding portion is formed at an intermediate portion in the insertion direction of the outer periphery wall portion, the protruding portion being inflected partway along the intermediate portion and protruding toward the radial direction outer side, and a distal end portion side of the protruding portion configures the abutting portion.

In the hole plug according to Note 2, the distal end portion side of the protruding portion that protrudes toward the radial direction outer side, which is formed at the intermediate portion in the insertion direction of the outer periphery wall portion, configures the abutting portion. Therefore, in contrast to, for example, a structure in which an abutting portion for abutting against a periphery edge portion of a burring hole is formed at a hole plug as a dedicated portion, there is no need to greatly alter the shape of the hole plug, and design costs may be restrained.

The disclosures of Japanese Patent Application No. 2017-016831 filed Feb. 1, 2017 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A hole plug, comprising:
   a tubular outer periphery wall portion for insertion into a round tube portion of a burring hole formed in an attachment member;
   an annular flange portion that protrudes toward a radial direction outer side of the outer periphery wall portion, from an end portion side of the outer periphery wall portion at an opposite side from an insertion direction side of the outer periphery wall portion, the flange portion covering a surrounding portion of the burring hole;
   a pawl portion that projects toward the radial direction outer side from the outer periphery wall portion, the pawl portion engaging with a distal end portion of the round tube portion;
   a closure portion that extends between inner sides of the outer periphery wall portion, the closure portion closing off the burring hole; and
   an abutting portion provided at the outer periphery wall portion, the abutting portion overlapping with a periphery edge portion of the burring hole as seen in the insertion direction, and the abutting portion configured to abut the periphery edge portion;
   wherein:
   an outer side protruding portion is a portion formed by an intermediate portion, in the insertion direction, of the outer periphery wall portion being inflected partway along the intermediate portion, the outer side protruding portion protruding along the radial direction toward the radial direction outer side but not diagonally with respect to the radial direction,
   a distal end portion side of the outer side protruding portion configures the abutting portion, and
   when the outer periphery wall portion is inserted into the burring hole, the abutting portion abuts on the peripheral edge portion to limit the movement of the outer periphery wall portion in the insertion direction, and
   wherein:
   the closure portion is provided with an annular inner side protruding portion, an annular inner periphery wall portion, and a face plate portion;
   the inner side protruding portion protrudes toward the radial direction inner side from the end portion at the insertion direction side of the outer periphery wall portion,
   the inner periphery wall portion extends from an inner periphery end portion of the inner side protruding portion to the opposite side from the insertion direction, and
   the face plate portion closes the end portion at the opposite side of the inner periphery wall portion from a side in the insertion direction,
   wherein reinforcing ribs that connect the inner periphery wall portion with the outer periphery wall portion are formed between the inner periphery wall portion and the outer periphery wall portion, and the face plate portion is on an insertion direction side of the outer side protruding portion.

2. The hole plug according to claim 1, wherein:
   a wall portion of the outer periphery wall extends in the insertion direction from the end portion at an opposite side from a side in the insertion direction, to the abutting portion.

* * * * *